(12) United States Patent
Croslin

(10) Patent No.: US 6,327,669 B1
(45) Date of Patent: *Dec. 4, 2001

(54) CENTRALIZED RESTORATION OF A NETWORK USING PREFERRED ROUTING TABLES TO DYNAMICALLY BUILD AN AVAILABLE PREFERRED RESTORAL ROUTE

(75) Inventor: William D. Croslin, Colorado Springs, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,220

(22) Filed: Dec. 31, 1996

(51) Int. Cl.[7] ........................................... G06F 11/14
(52) U.S. Cl. ................................ 714/4; 709/238
(58) Field of Search ................ 395/182.02, 183.19, 395/200.59, 200.68, 200.72, 184.01; 370/217, 225, 16, 220, 227, 228; 714/4, 43, 47; 709/229, 238, 242

(56) References Cited

U.S. PATENT DOCUMENTS

| | | | |
|---|---|---|---|
| 4,577,066 | | 3/1986 | Bimonte et al. . |
| 4,920,529 | | 4/1990 | Sasaki et al. . |
| 5,187,740 | * | 2/1993 | Swaim et al. ................ 379/209 |
| 5,335,268 | * | 8/1994 | Kelly, Jr. et al. ............. 379/112 |
| 5,459,716 | * | 10/1995 | Fahim et al. ................. 370/16 |
| 5,463,615 | | 10/1995 | Steinhorn . |
| 5,513,345 | * | 4/1996 | Sato et al. ................ 395/182.02 |
| 5,623,481 | * | 4/1997 | Russ et al. ............... 395/182.02 |
| 5,636,203 | * | 6/1997 | Shah ............................ 370/244 |
| 5,646,936 | * | 7/1997 | Shah et al. .................... 370/228 |
| 5,657,320 | * | 8/1997 | Russ et al. .................... 370/217 |
| 6,075,766 | * | 6/2000 | Croslin ........................ 370/225 |
| 6,163,525 | * | 12/2000 | Bentall ........................ 370/227 |

FOREIGN PATENT DOCUMENTS

| | | |
|---|---|---|
| 0 494 513 A2 | 12/1991 | (EP) . |
| WO 95/10149 | 4/1995 | (WO) . |

OTHER PUBLICATIONS

Herzberg et al. "The Hop–Limit Approach for Spare–Capacity Assignment in Survivable Networks" IEEE Dec. 3, 1995.

Dighe et al. "A Link Based Alternative Routing Scheme for Network Restoration under Failure" IEEE May 1995.

Grover et al. "Near Optimal Spare Capacity Planning in a Mesh Restorable Network" IEEE Jan. 1991.

Hasegawa et al. "Dynamic Reconfiguration of Digital Cross– Connect Systems with Network Control and Management" IEEE.

Bellary, et al. "Intelligent Transport Network Survivability: Study of Distributed and Centralized Control Techniques" IEEE 1990.

(List continued on next page.)

Primary Examiner—James P. Trammell
Assistant Examiner—Pierre E. Elisca

(57) ABSTRACT

A centralized restoration system utilizes preferred routing tables to identify an optimal restoral path for restoring a network from a failure. The preferred routing tables are constructed prior to the failure of the network. This pre-construction of the preferred routing tables prior to network failure substantially diminishes the computational and temporal requirements needed to restore the network at the time of failure. The centralized restoration system is able to account for changes in network topology and configuration. The centralized restoration system builds the optimal restoral path on a link by link basis and examines the availability of links prior to adding the link to the optimal restoral path. Unavailable links are not added to the restoral path.

23 Claims, 8 Drawing Sheets

OTHER PUBLICATIONS

Shimazaki et al. "Neopilot: An Integrated ISDN Fault Management System" IEEE Feb. 1990.

Shimazaki et al. "Network Fault Management" Sep. 1992.

Newport, et al. "Network Survivability Through Connectivity Optimization" IEEE 1987.

Flanagan et al. "Principles and Technologies for Planning Survivability–A Metropolitan Case Study", IEEE 1989.

M. Wehr "Protection of Synchronous Transmission Networks", Commutation and Transmission, No. 4, 1993.

Coan, et al. "Using Distributed Topology Update and Preplanned Configurations to Achieve Trunk Network Survivability" IEEE Oct. 1991.

Manione et al. "An Inconsistencies Tolerant Approach in the Fault Diagnosis of Telecommunications Network" Feb. 14, 1994.

Bouloutas, et al. "Alarm Correlation and Fault Identification in Communication Networks" Feb. 1, 1994.

* cited by examiner

Restoral Routes for End Pair A|E

Node E Preferred Routing Table

CENTRALIZED RESTORATION OF A NETWORK USING PREFERRED ROUTING TABLES TO DYNAMICALLY BUILD AN AVAILABLE PREFERRED RESTORAL ROUTE

TECHNICAL FIELD

The present invention relates generally to telecommunications systems and more particularly to centralized restoration of a network using preferred routing tables to dynamically build an available preferred restoral route.

BACKGROUND OF THE INVENTION

Telecommunications networks, such as telephone networks, are subject to failure. Given the volume of traffic and the criticality of some of the traffic on such telecommunications networks, it is desirable to be able to restore from failure as quickly as possible. In general, restoration involves the following steps: (1) detecting the failure; (2) isolating the location of the failure in the network; (3) determining a restoral route for network traffic; and (4) implementing the restoral route.

It is generally desirable to restore a failed network within a few seconds or less. Networks are typically restored by first restoring higher priority network elements and then restoring lower priority elements. Many conventional systems develop a "pre-plan" for restoring networks. These "pre-plans" are developed by simulating possible network failures and determining restoral routes to restore from the simulated failures. The development of these "pre-plans" entails collection of large amounts of data that reflect the logical topologies of the networks. Oftentimes, the data is collected from network engineering databases, which reflect the logical construction of the network by indicating connections and paths of network traffic trunks. A network analyst analyzes the collected data, compares the collected data to the physical topologies and then generates the "pre-plans." Since these "pre-plans" are developed prior to network failure, one of the "pre-plans" is ensured to be available for restoring traffic when a failure occurs. In general, these "pre-plans" are developed for a given segment of a network that can incur a failure. When the segment fails, the corresponding "pre-plan" is utilized.

Unfortunately, such static "pre-plans" have drawbacks. The topology and configuration of a network are frequently subject to change. The "pre-plans" do not account for such changes; rather, the "pre-plans" are developed for a given snapshot (i.e., a fixed topology and configuration) for the network. In addition, events may occur that make parts of the network unavailable so that the "pre-plans" fail because the "pre-plans" presume that the unavailable portions of the network are available.

Another class of restoration approaches dynamically determines restoral routes at the time of failure. Such "dynamic restoration methods" do not suffer the problems of inflexibility that are encountered with the static restoration methods described above. The dynamic restoration methods formulate a restoral route dynamically during the restoration process to use the most accurate and recent data regarding the network that is available. The drawback of such dynamic restoration approaches is that they require extensive and time-consuming analysis during the restoration process. As a result, the restoration process takes longer than with static restoration methods.

SUMMARY OF THE INVENTION

The present invention addresses the limitations of the conventional methods by providing a solution that incorporates features from both static restoration methods and dynamic restoration methods and adds new features. The present invention, like static restoration methods, creates and stores data regarding restoral routes prior to network failure so that substantial time and computational overhead need not be exhausted at the time of failure. On the other hand the present invention includes a mechanism for determining the availability of portions of the restoral routes at the time of network failure to determine whether the portions can be utilized in the implemented restoral route or not. This provides an added degree of flexibility to the system that accounts for changes in network topology and configuration.

In accordance with a first aspect of the present invention, a method of constructing a segment of a preferred restoral path for restoring a network from a failure is performed by a computer system. The network includes the computer system as well as additional interconnected nodes. Prior to the failure of the network, a preferred routing table is provided for a current node. The preferred routing table specifies choices for a next segment of one or more restoral paths to a target node. At the time of failure of the network, the preferred routing table is accessed to examine the choices for the next segment of the preferred restoral path, and one of the choices is selected.

In accordance with another aspect of the present invention, a method is practiced in a telecommunications network that has nodes, links for carrying network traffic between the nodes, and ports on the nodes for interfacing with the links. The telecommunications network also includes a central restoration system for restoring the network from failures. In accordance with this method, a location of a network failure is identified and at least one pair of end nodes that are affected by the network failure are identified. Preferred routing tables are provided for at least each of the nodes in the identified pair of end nodes. Each preferred routing table specifies a list of one or more ports that interface with links to a restoral path that leads to a target node. The list specifies priority of the ports. The preferred routing tables are used to determine a preferred restoral path for at least one of the identified end node pairs on a port by port basis. One of the preferred restoral paths is selected as the restoral path that is implemented by communicating with the nodes and the selected preferred restoral path.

In accordance with an additional aspect of the present invention, prior to a failure in a telecommunications network, a list of ports for connected nodes in the network is provided. Each list includes an indication of relative optimality of the ports and each port interfaces with a link that leads to another of the nodes that is part of a restoral path to a target node. A preferred restoral path is iteratively built on a link by link basis upon failure of the network. The preferred restoral path is built using the list of ports to identify optimal links in the preferred restoral path.

In accordance with yet another aspect of the present invention, a centralized restoration system is part of a telecommunications system that has nodes that are interconnected to facilitate communication among the nodes. The centralized restoration system restores the network after a failure. The centralized restoration system includes a static component and a dynamic component. The static component provides preferred routing tables that each identify portions of at least one preferred restoral route for restoring a connection between two of the nodes. The dynamic component dynamically determines a restoral route and a time of failure in the network by using the preferred routing tables based on availability of portions of the preferred restoral routes identified in the tables.

BRIEF DESCRIPTION OF THE DRAWINGS

A preferred embodiment of the present invention will be described below relative to the following figures.

DETAILED DESCRIPTION OF THE INVENTION

The preferred embodiment of the present invention provides a centralized method for network restoration that uses preferred routing tables. The method of the preferred embodiment combines the accuracy of dynamic restoration methods with the speed and low computational overhead of static pre-fabricated restoration methods. The preferred routing tables identify preferred routes between node pairs in the network. Such preferred routing tables are created prior to the initiation of restoration (i.e., prior to network failure). These tables are utilized during restoration to incrementally build and optimize restoral routes on a link by link basis. Thus, there is no need for analyzing network topology during restoration as in conventional dynamic restoration systems, but the system has the ability to account for changes in network topology and failures caused by recent events within the network. If a link is unavailable, the link is not utilized in building the restoral route. The preferred embodiment of the present invention optimizes the restoral route at each link as the restoral route is built.

Figure 1:
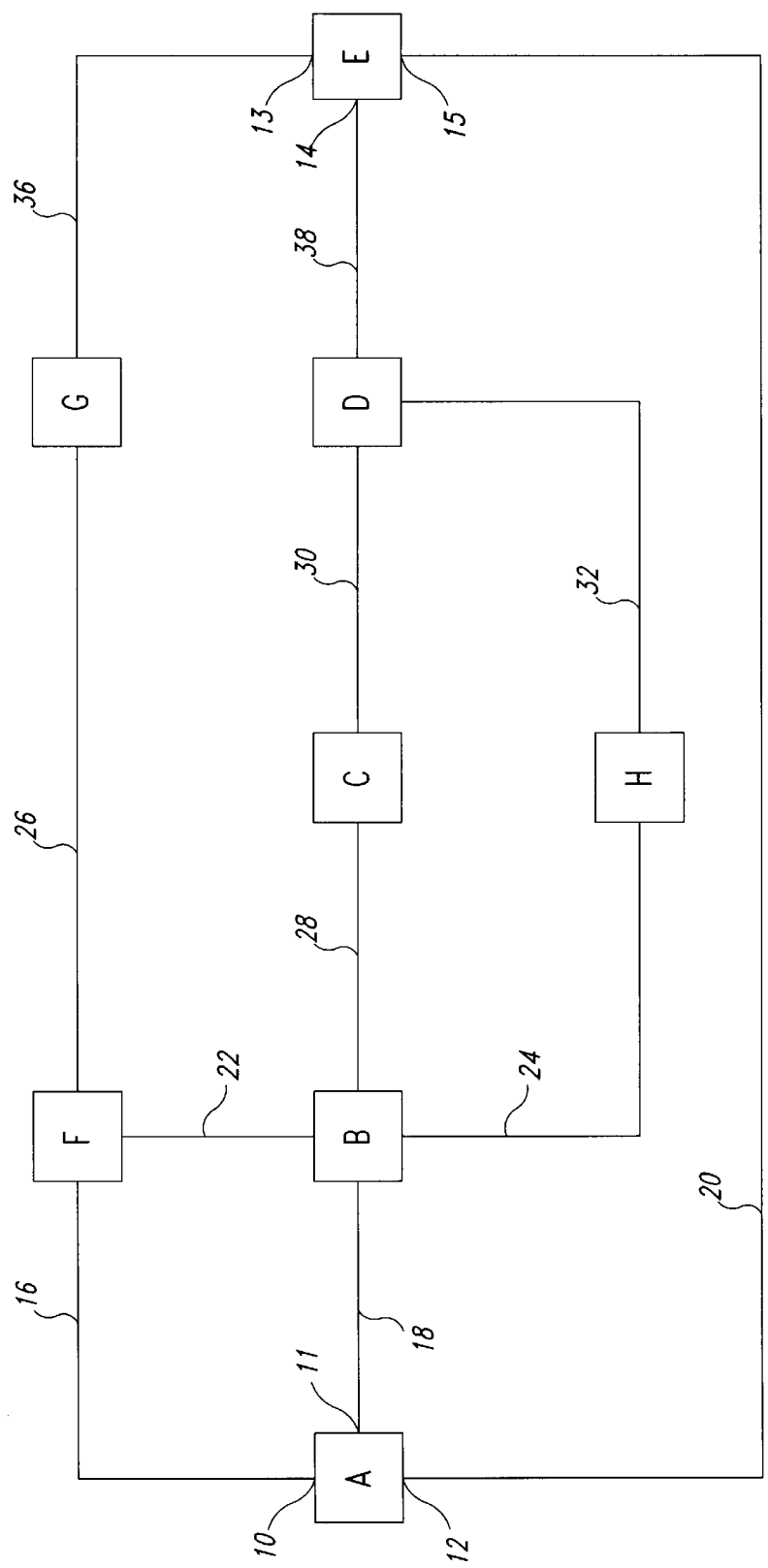
FIG. 1 illustrates an example of a network node topology for a telecommunications network.

FIG. 1 illustrates an example of a topology for a portion of a telecommunication network. For purposes of the discussion below, it may be assumed that the network is a long distance carrier telephone network. Those skilled in the art will appreciate that the network node topology depicted in FIG. 1 is intended to be merely illustrative and not limiting of the present invention. Tile present invention may be practiced with other network node topologies. The example network node topology of FIG. 1 will be referenced below in discussing the operation of the preferred embodiment.

The network node topology of FIG. 1 includes nodes A, B, C, D, E, F, G and H. A "node" as used hereinafter is a physical link in a network that represents a terminal or a system. A node may be, for example, a digital cross connect (DXC) system, multiplexing equipment, line termination equipment and/or a fiber transmission system. Only nodes that are used in the network restoration (i.e., "restoration nodes") are depicted in FIG. 1. Nodes that are not useful for network restoration (i.e., "intervening nodes"), such as nodes containing only digital repeater equipment, are not depicted in FIG. 1. Each of the nodes has one or more ports for interfacing with links. For example, node A includes ports 10, 11 and 12, and node E contains ports 13, 14 and 15. Each port interfaces with a link. Thus, port 10 interfaces with link 16, port 11 interfaces with link 18 and port 12 interfaces with link 20. A "link" is a physical connection between two nodes for carrying network traffic. The links 16, 18, 20, 22, 24, 26, 28, 30, 32, 36 and 38 interconnect the nodes A–H. A single link usually includes multiple trunks where a "trunk" is a logical channel of communication with capacity that traverses one or more nodes and/or one or more links between nodes. A trunk acts as a channel of communication through the network of a given bandwidth. A single trunk generally includes one or more links that span multiple nodes. For example, a single trunk includes links 18, 28, 30 and 38.

Figure 2:
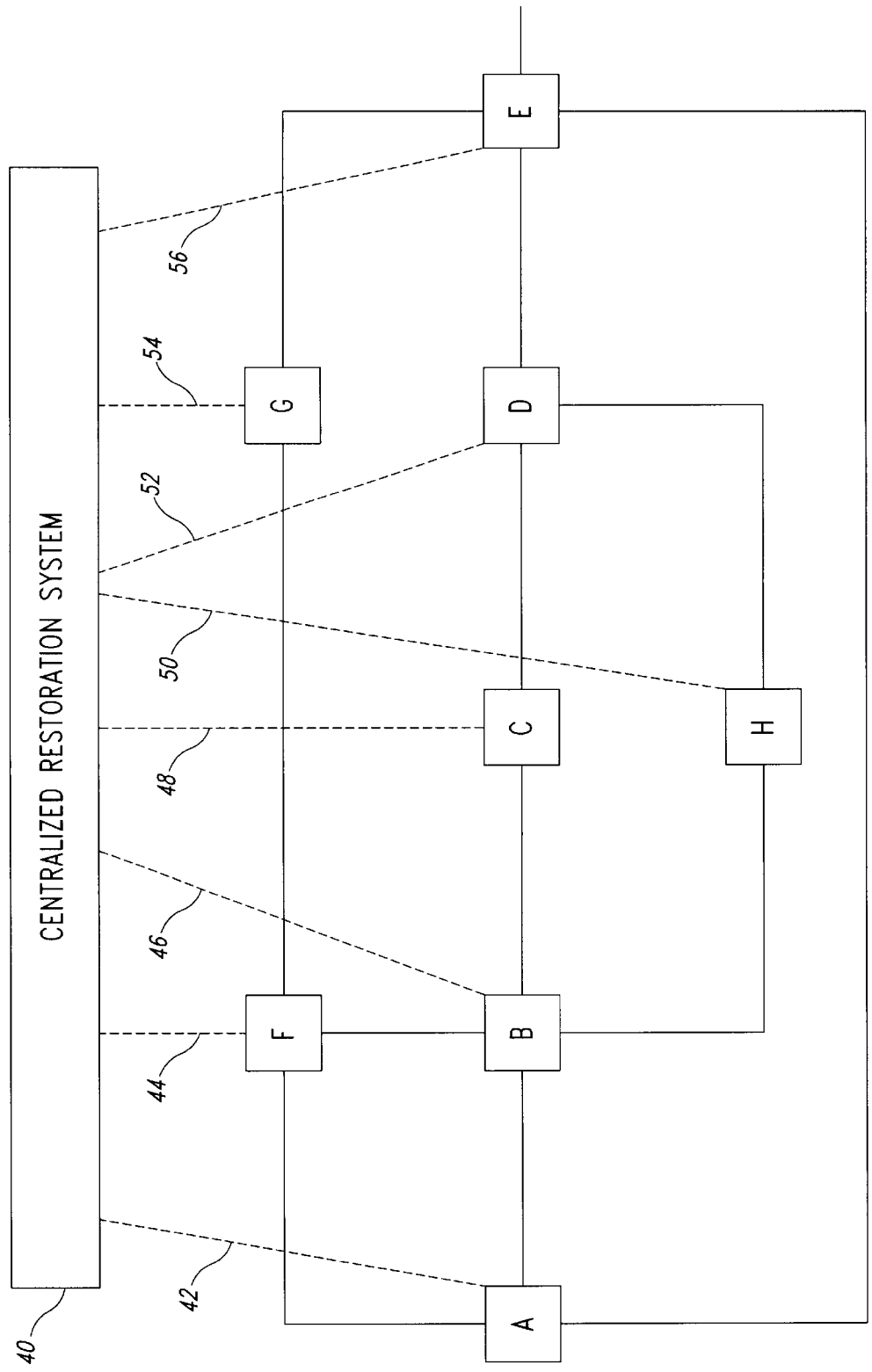
FIG. 2 illustrates a telecommunications network that is suitable for practicing the preferred embodiment of the present invention.
Figure 3:
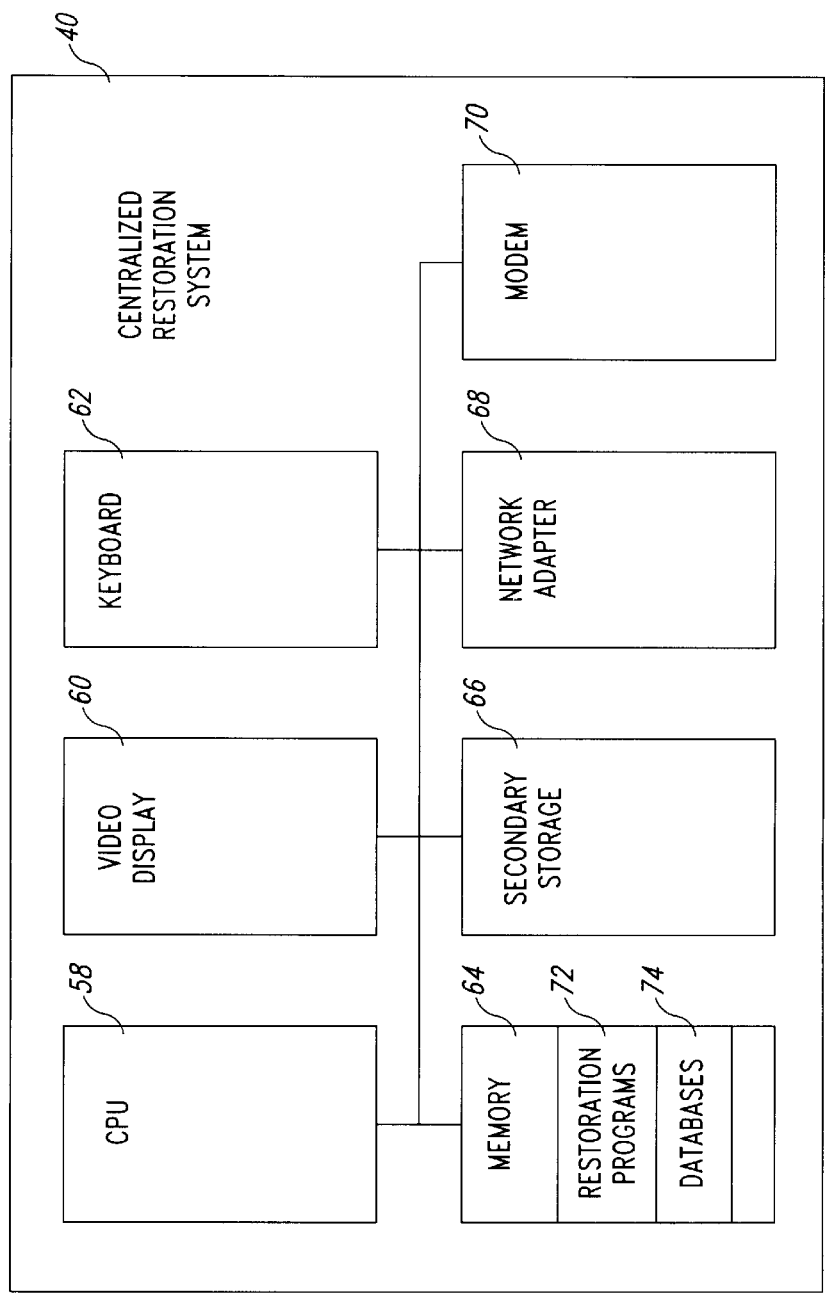
FIG. 3 illustrates an exemplary configuration of a centralized restoration system.

The preferred embodiment of the present invention provides a centralized restoration system 40 (FIG. 2) for restoring a failure within the network. Each node A–H includes at least one data link 42, 44, 46, 48. 50, 52, 54 and 56 with the centralized restoration system 40. The centralized restoration system 40 may be implemented on a computer system like that depicted in FIG. 3. Those skilled in the art will appreciate that the computer system depicted in FIG. 3 is intended to be merely illustrative and not limiting of the present invention. Suitable computer systems for practicing the preferred embodiment of the present invention include the VAX line of computers from Digital Equipment Corporation and the RS 6000 from International Business Machines Corporation.

As can be seen in FIG. 3, the centralized restoration system computer 40 includes a central processing unit (CPU) 58 for controlling operation of the system. The centralized restoration system may also include a video display 60 and a keyboard 62. Memory 64 is provided along with secondary storage 66. The memory may hold copies of restoration programs 72 that hold the instructions for performing the centralized network restoration of the preferred embodiment of the present invention. These programs 72 access databases 74 that hold tables and other useful information that will be described in more detail below. The computer system of the centralized restoration system 40 may also include additional peripheral devices such as a network adapter 68 and a modem 70.

Figure 4:
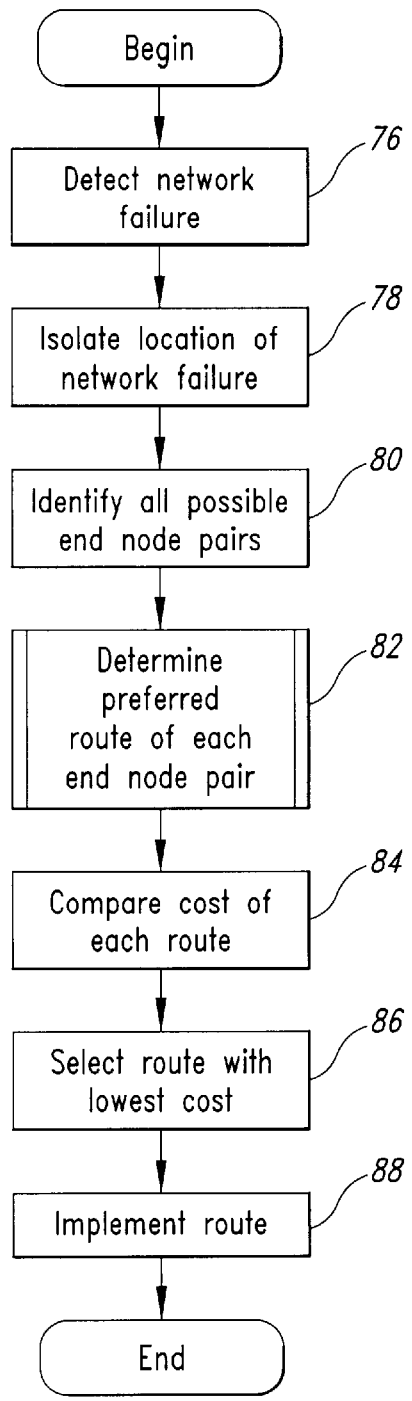
FIG. 4 is a flowchart that illustrates the steps that are performed in a first alternative of the preferred embodiment of the present invention.

During normal operation, traffic is sent between nodes A–H over links 16–38. However, when a failure occurs, alarm signals are generated and the restoration process is initiated. FIG. 4 is a flowchart that illustrates the steps that are performed by a first alternative of the preferred embodiment of the present invention to realize restoration of the network. These steps are performed by the restoration program 72 (FIG. 3) when executed on the CPU 58. The process begins when the central restoration system 40 detects failure within the network (step 76 in FIG. 4). A trunk upon which the failure occurs causes ports that face the point of failure to generate alarms. These ports are capable of detecting impairments in signals and generate alarms in response. Each alarm specifies a port that generated it. The central restoration system 40 then isolates the location of the network failure based on knowledge of the logical topology and the alarms that are received (step 78 in FIG. 4). A suitable approach for locating the point of network failure is described in a copending application entitled "METHOD AND APPARATUS FOR ISOLATING NETWORK FAILURES BY APPLYING ALARMS TO FAILURE SPANS," which is assigned to a common assignee with the present application and which is explicitly incorporated by reference herein. Those skilled in the art will appreciate that the detection of network failure (step 76 in FIG. 4) and the isolation of the point of network failure (step 78 in FIG. 4) may be performed using any of a number of conventional techniques.

Once the location of the failure has been isolated, all possible end node pairs for which traffic must be restored are identified (step 80 in FIG. 4). An example is helpful to illustrate what end pairs are identified. Suppose that a failure occurs on link 28 between nodes B and C. The trunk that traverses nodes A, B, C, D and F reports the alarms. In such an instance, node pairs B/C, B/D, B/E, A/C, A/D and A/E are identified as end node pairs for which traffic must be restored.

The preferred embodiment then determines a preferred restoral route for each end node pair that was identified in step 80 (step 82 in FIG. 4). As was mentioned above, the determination of the preferred restoral routes is based on analysis that was performed prior to the network failure. Thus, the restoration entails selecting appropriate preferred routes rather than extensive examination of the network topology.

Figure 5:
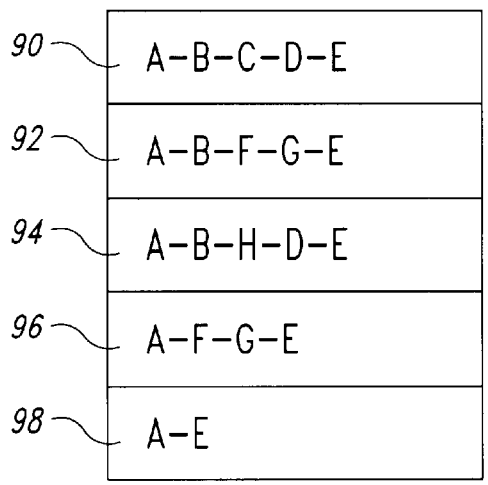
FIG. 5 lists examples of restoral routes for end node pair A/E.

In order to gain an appreciation for how the preferred embodiment determines preferred restoral routes for each end node pair, it is useful to consider an example. Suppose that the end node pair in question is A/E. The restoral routes that are available for the end node pair A/E are depicted in FIG. 5. The routes 90, 92, 94, 96 and 98 list the sequence of nodes that are traversed in the route. These restoral routes 90–98 are shown in FIG. 5 in a sequence corresponding to their priority. Specifically, each restoral route is listed in accordance with its cost, where route 90 has the least cost and route 98 has the greatest cost.

Figure 7:
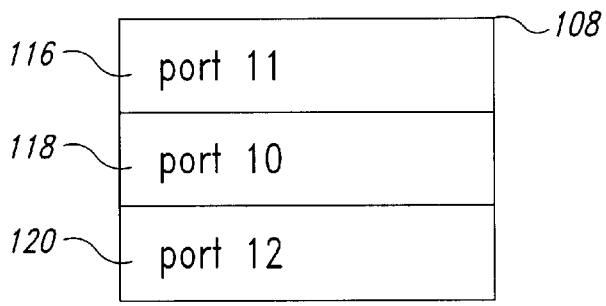
FIG. 7 illustrates an example of the node E preferred routing table.
Figure 6:
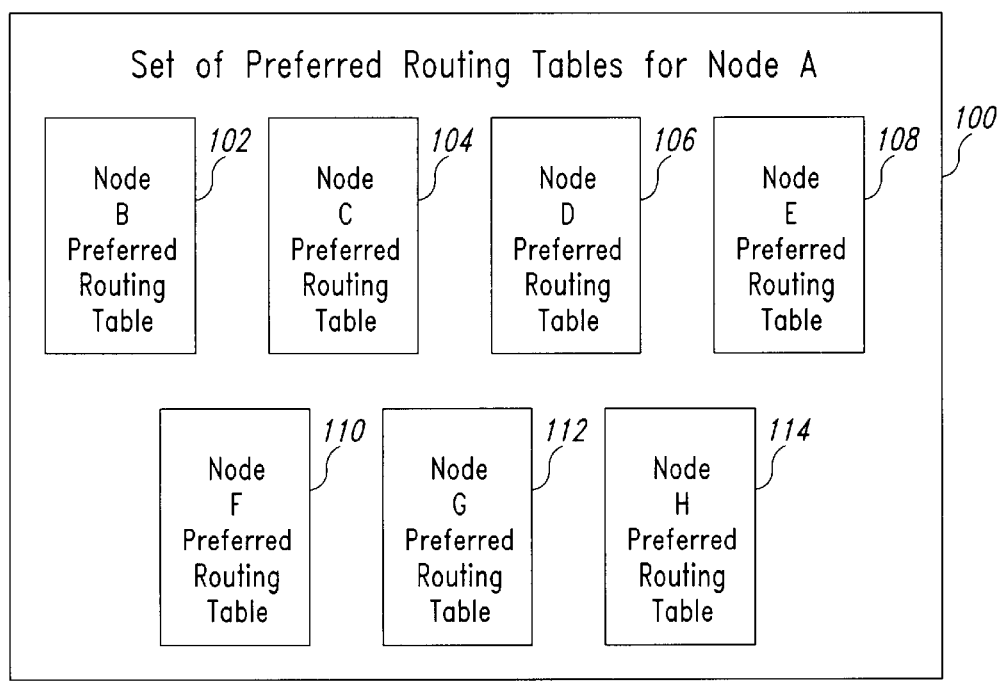
FIG. 6 illustrates a set of preferred routing tables for node A.

Preferred routing tables are maintained for each node in the network. In particular, a set of preferred routing tables is maintained for each node such that a separate preferred routing table is maintained for each other node within the network. FIG. 6 depicts an example of the set of preferred routing tables for node A 100. As can be seen in FIG. 6, separate preferred routing tables 102, 104, 106, 108, 110, 112 and 114 are maintained for nodes B–H, respectively. Each preferred routing table lists the ports of the associated node (i.e., node A in this case) in order of priority. FIG. 7 shows an example of the node E preferred routing table 108 that is within the set of preferred routing tables for node A 100. This preferred routing table 108 includes three entries: 116, 118 and 120. Entry 116 lists port 11 of node A as the preferred port. Similarly, entry 118 lists port 10 as the next preferred port, and entry 120 lists port 12 as the least preferred port. The ports listed in entries 116, 118 and 120 correspond to the ports that transmit network traffic to the next node in each restoral route. The nodes are listed in the order of preference of the restoral routes that they support. Thus, returning to the restoral routes listed in FIG. 5 for the end node pair A/E, it is seen that restoral routes 90, 92 and 94 begin with link 18 that connects node A with node B. Port 11 is used for link 18. The next most preferred restoral route 96 uses port 10 to forward traffic from node A to node F over link 16. Port 12, listed in entry 120, is coupled to link 20 that leads to node E. The lowest priority restoral route 98 utilizes port 12.

Each port is listed only once even though the link to an adjacent node may be utilized in multiple preferred routes. For example, the link 18 that connects node A to node B is part of restoral routes 90, 92 and 94. A suitable method for creating the preferred routing tables prior to restoration is set forth in a copending application entitled "METHOD AND APPARATUS FOR CREATING PREFERRED ROUTES FOR NETWORK RESTORATION," which was filed on even date herewith on behalf of a common assignee and which is explicitly incorporated by reference herein. These preferred routing tables may be stored in the databases 74 (FIG. 3) within the centralized restoration system 40.

Figure 8:
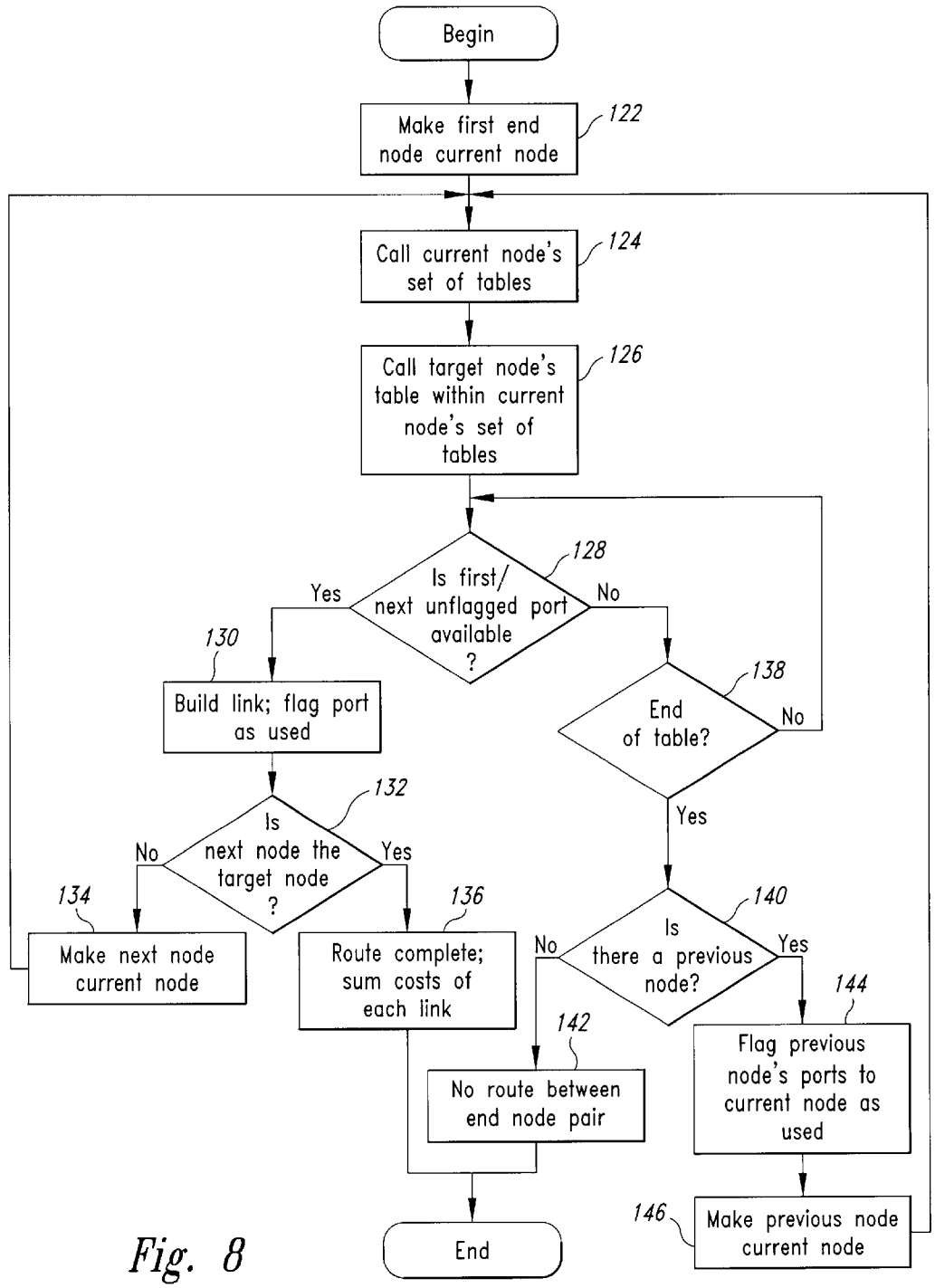
FIG. 8 is a flowchart illustrating the steps that are performed to identify an optimal preferred restoral path in accordance with a preferred embodiment of the present invention.

FIG. 8 depicts in more detail the steps that are performed for each end node pair as part of step 82 of FIG. 4. Initially, the first end node in the pair is designated as the current node (step 122 in FIG. 8). For the example end node pair A/E, node A is designated as the current node. The set of preferred routing tables for the current node is then accessed (step 124 in FIG. 8). In the instance where node A is the current node, the set of preferred routing tables for node A 100 is accessed. The preferred routing table for node E 108 is then accessed (step 126 in FIG. 8). The central restoration system 40 checks whether the next port listed in the preferred routing table is available or not (step 128 in FIG. 8). The determination of whether the port is available or not is made by accessing a real time topology database stored within the databases 74 that identifies the use and availability of each port within the network. Initially, each of the ports listed within the preferred routing table is unflagged. For the example case of the node E preferred routing table 108, port 11 is the next unflagged port. Suppose that port 11 on node A is available. In such a case, the A to B link 18 is identified as the first link of the preferred restoral route, and the port 11 is flagged as being used (step 130 in FIG. 8). Once the port is flagged as used, the port will not be considered in another restoral route until the flag is reset. The system checks whether the next node (i.e., the node at the end of the recently added link) is the target node. The target node is the node at the far end of the node end pair. In the example in node pair A/E, node E is the target node. For the example discussed above, the next node would be node B and the target node is node E; thus, the next node is not the target node. The next node is made the current node in step 134 of FIG. 8 for instances where the next node is not the target node. The process then repeats itself with the new current node beginning at step 124.

In the case where the next node is the target node (as checked in step 132 of FIG. 8), the complete preferred restoral route for the end node pair has been built and the sum of the cost of the restoral route is calculated (step 136 in FIG. 8). The sum of the restoral route is calculated by summing the cost of each link within the restoral route. The costs associated with each link have already been determined prior to network failure and are recorded within the databases 74 of the central restoration system 40.

There may be instances in step 128 of FIG. 8 where the next unflagged port is not available. In such cases, the central restoration system 40 checks whether the end of the preferred routing table has been reached or not (step 138 in FIG. 8). If the end of the preferred routing table has not been reached, the next unflagged port is examined to determine if it is available (step 128 in FIG. 8). For the node E preferred routing table 108 shown in FIG. 7, if port 11 is not available, the system determines whether port 10 is available.

If in step 138 of FIG. 8 it is determined that the end of the preferred routing table has been reached, the system checks whether there is a previous node (step 140 in FIG. 8). If there is not a previous node, then there is no preferred restoral route between the end node pair, and the next end node pair is processed (step 142 in FIG. 8). In contrast, if there is a previous node, the previous node's ports that lead to the current node are flagged as used (step 144 in FIG. 8). To ensure that the links to the current node are not again scrutinized in building a restoral route, the centralized restoration system then marks the previous node as the current node to reinitiate the process beginning with the previous node (step 146 in FIG. 8). Thus, if the centralized restoration system 40 has started the A/E restoral route by building a link from node A to node B and has not found any available unflagged ports for node B routes to node E, the centralized restoration system returns to node A and makes node A the current node.

In the optimal case, links 18, 28, 30 and 38 are all available and the steps shown in the flowchart of FIG. 8 are performed to build the preferred restoral route 90, which has the lowest cost. The system calculates the costs for each available preferred restoral route. The costs of each preferred restoral route that was determined in step 82 of FIG. 4 are then compared to identify the lowest cost restoral route (step 84 in FIG. 4). The lowest cost preferred restoral route is then selected (step 86 in FIG. 4) and implemented (step 88 in FIG. 4) by sending the appropriate commands to each participant node via the data links 42–56.

Figure 9:
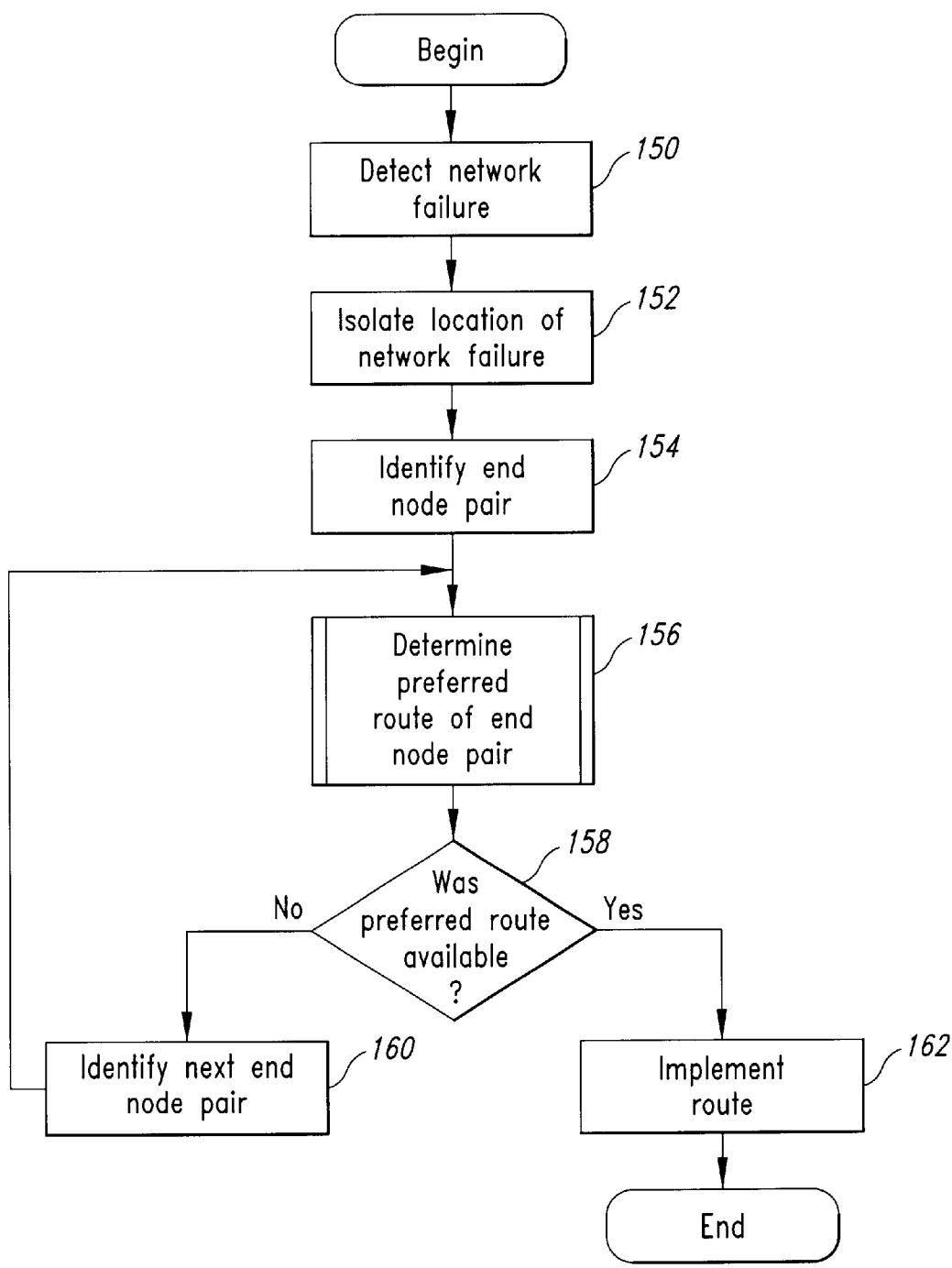
FIG. 9 illustrates the steps that are performed by a second alternative of a preferred embodiment of the present invention to restore the network from a failure.

FIG. 9 depicts the steps that are performed in a second alternative of the preferred embodiment of the present invention. In this alternative embodiment, a network failure is detected (step 150 in FIG. 9) and the location of the network failure is isolated (step 152 in FIG. 9) in a fashion like that described above relative to the first alternative of FIG. 4. In this alternative embodiment, however, only one end node pair is identified (step 154 in FIG. 9). The identified or selected end node pair is preferably the end node pair that immediately circumvents the failure. For the example case where the failure occurs in the link between node B and node C, B/C is the end node pair that is selected. In step 156, a preferred route for a selected end node pair is determined by performing the steps of FIG. 8. In step 158, the system determines whether the determined preferred route is available or not. If the determined route is not available, the next end node pair is identified (step 160 in FIG. 9), and the process is repeated beginning at step 156. On the other hand, if the preferred route is available, the preferred route is implemented as the restoral route (step 162 in FIG. 9).

The benefit of the second alternative is that it is more quickly performed than the first alternative. This second alternative implements the first available restoral route. The one drawback of the second alternative is that it has the potential of determining a less than optimal restoral route.

While the present invention has been described with reference to a preferred embodiment thereof, those skilled in the art will appreciate that various changes in form and detail may be made without departing from the intended scope of the present invention as defined in the appended claims. For example, the present invention may be practiced with different types of networks other than telephone networks. The present invention may be practiced with computer networks, such as local area networks or wide area networks. Moreover, the centralized restoration system may be a multiple processor system.

What is claimed is:

1. In a network having interconnected nodes and a computer system a method of constructing a segment of a preferred restoral path for restoring the network from a failure, comprising the computer-implemented steps of:
prior to the failure of the network,
    providing a preferred routing table for a current node among the interconnected nodes that specifies choices for a next segment of one or more restoral paths to a target node for restoring the network from the failure;
at a time of the failure of the network,
    (i) accessing the preferred routing table to examine the choices for the next segment of the preferred restoral path from the current node to the target node; and
    (ii) selecting one of the choices as a next segment of the preferred restoral path to be used in restoring the network from the failure.

2. The method of claim 1, further comprising the steps of:
determining that the segment of a first of the choices is unavailable; and
eliminating the first of the choices as a viable choice for selection.

3. The method of claim 1 wherein the selected next segment of the preferred restoral path includes a connection between the current node and a subsequent node of the interconnected nodes, wherein a preferred routing table is provided for the subsequent node prior to the failure of the network that specifies choices for an additional segment of one or more of the restoral paths to the target node and wherein the method further comprises the steps of:
    at the time of the failure of the network,
        (i) accessing the preferred routing table of the subsequent node to examine the choices for the additional segment of the preferred restoral path; and
        (ii) selecting one of the choices of the preferred routing table of the subsequent node as the additional segment of the preferred restoral path.

4. The method of claim 1, further comprising the step of implementing the preferred restoral path.

5. The method of claim 1, wherein the nodes are interconnected by links and wherein the step of providing the preferred routing table comprises providing a list of ports that interface with links that lead to adjacent ones of the interconnected nodes in the one or more restoral paths.

6. The method of claim 5 wherein the ports are prioritized according to cost of using the links with which the ports interface, wherein priority of each port relates inversely to the cost of the link with which the port interfaces.

7. The method of claim 6 wherein the port with the highest priority is selected.

8. The method of claim 1 wherein the network is a telecommunications network.

9. The method of claim 1 wherein the network is a telephone network.

10. In a telecommunications network having nodes, links for carrying network traffic between nodes, ports on the nodes for interfacing with the links, and a centralized restoration system for restoring the network from failures, a method of restoring the network performed by the centralized restoration system, comprising the steps of:
identifying a location of a network failure;
identifying at least one pair of end nodes that are affected by the network failure such that the failure prevents traffic from flowing between the end node pairs over given connecting paths;
providing preferred routing tables for at least each of the nodes in the identified pairs of end nodes, wherein each preferred routing table specifies a list of one or more ports that interface with links to a restoral path that leads to a target node, said list specifying priority of the one or more ports;

using the preferred routing tables to determine a preferred restoral path for at least one of the identified end node pairs on a port by port basis;

selecting one of the preferred restoral paths as a restoral path to be implemented; and communicating with selected ones of the nodes to implement the selected restoral path to restore the network from the network failure.

11. The method of claim 10 wherein only a single pair of end nodes is identified.

12. The method of claim 10 wherein all of the end node pairs that are affected are identified.

13. The method of claim 10 wherein each preferred restoral path has an associated cost and a lowest cost one of preferred restoral paths is selected to be implemented.

14. The method of claim 10 wherein the telecommunications network includes a trunk, wherein the failure occurs after the trunk and wherein the nodes in the end node pairs are connected by the trunk.

15. The method of claim 10 wherein the preferred routing tables are provided prior to the failure.

16. In a telecommunications network having nodes with ports that interface with links to interconnect the nodes and a computer system, a method comprising the computer-implemented steps of:

prior to a failure in the telecommunications network, providing lists of ports for connected nodes in the network wherein each list provides an indication of relative A B preference of the ports listed therein and each port interfaces with one of the links that leads to another one of the nodes that is part of a restoral path that leads to a target one of the nodes for restoring the network in response to a failure of the network; and upon failure of the network, iteratively building a preferred restoral path on a link by link basis by using the lists of ports to identify optimal links in the preferred restoral path.

17. The method of claim 16. further comprising the step of implementing the preferred restoral path to restore the network for network traffic.

18. The method of claim 16 wherein the computer system is a tightly-coupled computer system that performs the steps of the method.

19. In a telecommunications system network having nodes that are interconnected to facilitate communications among the nodes, a centralized system for restoring the network after a failure comprising:

a static component that provides prior to failure of the network, preferred routing tables that each identify portions of at least one preferred restoral route for restoring a connection between two of the nodes; and a dynamic component for dynamically determining a restoral route at a time of a failure in the network, said dynamic component using the preferred routing tables to determine a selected preferred restoral route based on availability of portions of the preferred restoral routes identified in the tables.

20. In a network having interconnected nodes and a computer system, a computer-readable medium holding computer-executable instructions for performing a method of constructing a segment of a preferred restoral path for restoring the network from a failure, comprising the computer-implemented steps of:

prior to the failure of the network,
  providing a preferred routing table for a current node among the interconnected nodes that specifies choices for a next segment of one or more restoral paths to a target node for restoring the network from the failure;

at a time of the failure of the network,
  (i) accessing the preferred routing table to examine the choices for the next segment of the preferred restoral path from the current node to the target node; and
  (ii) selecting one of the choices as a next segment of the preferred restoral path to be used in restoring the network from the failure.

21. The computer-readable medium of claim 20 wherein the method further comprises the steps of:

determining that the segment of a first of the choices in unavailable; and eliminating the first of the choices as a viable choice for selection.

22. The computer-readable medium of claim 20 wherein the selected next segment of the preferred restoral path includes a connection between the current node and a subsequent node of the interconnected nodes, wherein a preferred routing table is provided for the subsequent node prior to the failure of the network that specifies choices for an additional segment of one or more of the restoral paths to the target node and wherein the method further comprises the steps of:

at the time of the failure of the network,
  (i) accessing the preferred routing table of the subsequent node to examine the choices for the additional segment of the preferred restoral path; and
  (ii) selecting one of the choices of the preferred routing table of the subsequent node as the additional segment of the preferred restoral path.

23. In a telecommunications network having nodes, links for carrying network traffic between nodes, ports on the nodes for interfacing with the links, and a centralized restoration system for restoring the network from failures, a computer-readable medium holding computer-executable instructions for performing a method of restoring the network performed by the centralized restoration system, comprising the steps of:

identifying a location of a network failure;

identifying at least one pair of end nodes that are affected by the network failure such that the failure prevents traffic from flowing between the end node pairs over given connecting paths;

providing preferred routing tables for at least each of the nodes in the identified pairs of end nodes, wherein each preferred routing table specifies a list of one or more ports that interface with links to a restoral path that leads to a target node, said list specifying priority of the one or more ports;

using the preferred routing tables to determine a preferred restoral path for at least one of the identified end node pairs on a port by port basis;

selecting one of the preferred restoral paths as a restoral path to be implemented; and communicating with selected ones of the nodes to implement the selected restoral path to restore the network from the network failure.

* * * * *